United States Patent
Suzuki

(10) Patent No.: US 11,795,528 B2
(45) Date of Patent: Oct. 24, 2023

(54) ALUMINUM ALLOY MATERIAL AND METHOD FOR MANUFACTURING THE SAME

(71) Applicant: TOYOTA JIDOSHA KABUSHIKI KAISHA, Toyota (JP)

(72) Inventor: Kojiro Suzuki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/936,404

(22) Filed: Sep. 29, 2022

(65) Prior Publication Data
US 2023/0120599 A1    Apr. 20, 2023

(30) Foreign Application Priority Data
Oct. 4, 2021    (JP) .................. 2021-163313

(51) Int. Cl.
*C22C 21/02*    (2006.01)
*C22C 1/00*    (2023.01)
*C22C 21/04*    (2006.01)

(52) U.S. Cl.
CPC ............. *C22C 21/02* (2013.01); *C22C 1/00* (2013.01); *C22C 21/04* (2013.01)

(58) Field of Classification Search
CPC ...................................................... C22C 21/02
See application file for complete search history.

(56) References Cited

U.S. PATENT DOCUMENTS

| | | | | |
|---|---|---|---|---|
| 6,267,829 B1 * | 7/2001 | Backerud | ............... | C22C 21/04 148/438 |
| 10,260,136 B2 * | 4/2019 | Yoon | ............... | C22F 1/043 |
| 2004/0265163 A1 * | 12/2004 | Doty | ............... | C22C 21/04 420/548 |
| 2008/0000561 A1 * | 1/2008 | Ikuno | ............... | C22C 21/04 148/417 |
| 2011/0100515 A1 * | 5/2011 | Lumley | ............... | C22C 21/02 148/438 |

FOREIGN PATENT DOCUMENTS

| | | |
|---|---|---|
| JP | H0835030 A | 2/1996 |
| JP | 2005200744 A | 7/2005 |
| JP | 2005264301 A | 9/2005 |
| JP | 2011132604 A | 7/2011 |
| WO | WO-2014109624 A1 * | 7/2014 ........... B22D 21/007 |

* cited by examiner

*Primary Examiner* — Christopher S Kessler
(74) *Attorney, Agent, or Firm* — Dickinson Wright, PLLC

(57) ABSTRACT

Provided is an aluminum alloy material for die-casting that allows being manufactured at low-price and has a high strength property and a sufficient elongation property as an aluminum alloy, and a method for manufacturing the same. An aluminum alloy material for die-casting contains Si: 9.6 mass % to 12 mass %, Cu: 1.5 mass % to 3.5 mass %, Mg: more than 0.3 mass % to 1.6 mass %, Zn: 0.01 mass % to 3.5 mass %, Mn: 0.01 mass % to 0.7 mass %, Fe: 0.01 mass % to 1.3 mass %, and Al and inevitable impurities: balance when the aluminum alloy material for die-casting as a whole is 100 mass %, and a mass ratio of Fe to Mn (Fe/Mn) is 4.4 or less.

3 Claims, 3 Drawing Sheets

Example 9

Needle-Like    Block-Like

Example 3

Block-Like

ALUMINUM ALLOY MATERIAL AND METHOD FOR MANUFACTURING THE SAME

CROSS REFERENCE TO RELATED APPLICATIONS

The present application claims priority from Japanese patent application JP 2021-163313 filed on Oct. 4, 2021, the entire content of which is hereby incorporated by reference into this application.

BACKGROUND

TECHNICAL FIELD

The present disclosure relates to an aluminum alloy material, especially an aluminum alloy material for die-casting, and a method for manufacturing the same.

DESCRIPTION OF RELATED ART

For improving a fuel efficiency and reducing a power consumption by weight reduction of automobile components, it has been examined to replace a conventionally used iron-based material with an aluminum material or an aluminum alloy material. Since an excellent corrosion resistance and high strength and workability are required for the automobile components, an Al-Si based alloy is heavily used among the aluminum alloy materials.

For example, JP H08-35030 A discloses an aluminum alloy for casting having an excellent strength. The aluminum alloy for casting contains 9.0 mass % to 12.0 mass % of Si, 3.0 mass % to 6.0 mass % of Cu, 0.7 mass % to 2.0 mass % of Mg, 0.5 mass % to 2.0 mass % of Zn, 1.2 mass % or less of Fe, with the balance consisting of Al and inevitable impurities.

JP 2005-264301 A discloses an aluminum alloy for casting containing Si: 9 mass % to 12 mass %, Cu: 1 mass % to 4 mass %, Mg: 0.01 mass % to 1 mass %, Ni: 0.01 mass % to 1 mass %, Mn: 0.01 mass % to 1 mass %, Fe: 0.01 mass % to 2 mass %, Zn: 0.01 mass % to 2 mass %, 0.0001 mass % to 0.5 mass % of a solid solution Si inhibition element, and the balance consisting of Al and inevitable impurities when the whole is 100 mass %. The solid solution Si inhibition element reduces an amount of Si as a solid solution in an Al based matrix by accelerating crystallization of Si from a molten alloy in a cooling solidification step of cooling and solidifying the molten alloy containing the aluminum alloy for casting. The aluminum alloy for casting provides an aluminum alloy casting excellent in dimensional stability even in an as-cast state.

JP 2011-132604 A discloses an aluminum alloy casting molded by die-casting using an aluminum alloy for die-casting. The aluminum alloy casting contains Si: 9.0 mass % to 12.0 mass %, Mg: 0.20 mass % to 0.80 mass %, Mn+Fe: 0.7 mass % to 1.1 mass %. A Mn/Fe ratio is 1.5 or more. Cu is restricted to 0.5 mass % or less. Zn, Ni, Sn as inevitable impurities are restricted to 0.05 mass % or less. Pb, Bi as inevitable impurities are restricted to 0.005 mass % or less. The balance consists of aluminum and the inevitable impurities. The aluminum alloy casting includes a heat radiating fin (31) for an electric heat generating component (30). The heat radiating fin (31) includes a plurality of thin fin portions (31b) integrally molded on both front and back surfaces of a flat plate-shaped substrate (31a). A circular mounting hole (31c) is provided at a flat portion in which the thin fin portions (31b) are not molded in the substrate (31a). The electric heat generating component (30) is formed in a columnar outer shape. The electric heat generating component (30) having the columnar outer shape is pressed into the circular mounting hole (31c) and fixed.

SUMMARY

However, since the conventional aluminum alloy material for die-casting (in this description and the like, the "aluminum alloy material for die-casting" means a raw material (including a state of powder or the like, a state of molten metal, and a state of casting (for example, aluminum alloy ingot)) of an aluminum die-cast alloy) requires a high aluminum purity, the cost easily increases. Furthermore, an aluminum alloy (in this description and the like, the "aluminum alloy" includes an aluminum alloy material for die-casting (usually, casting state) and an aluminum die-cast alloy made of an aluminum alloy material for die-casting) is required to be not only high strength properties (for example, hardness, tensile strength, yield stress) but also sufficiently excellent elongation properties (for example, elongation ratio) that may be incompatible with the strength properties.

Therefore, the present disclosure provides an aluminum alloy material for die-casting that allows being manufactured at low-price and has a high strength property and a sufficient elongation property as an aluminum alloy, and a method for manufacturing the same.

To manufacture an aluminum alloy material for die-casting at low-price, it is considered to use an aluminum scrap as a raw material.

However, the aluminum scrap that is low-price as a raw material contains a large amount of magnesium (Mg), zinc (Zn), and iron (Fe) that possibly cause a reduction of the tensile strength or the elongation ratio of the aluminum alloy.

Therefore, the inventor examined various means to solve the problem, and found the following. An aluminum alloy having a sufficient elongation property while having a high strength property can be manufactured by adjusting a mass ratio of Fe to manganese (Mn) (Fe/Mn) in an aluminum alloy material for die-casting containing Fe, Mn, Mg, and Zn. Thus, the inventor achieved the present disclosure.

That is, the gist of the present disclosure is as follows.
(1) An aluminum alloy material for die-casting comprises: Si: 9.6 mass % to 12 mass %, Cu: 1.5 mass % to 3.5 mass %, Mg: more than 0.3 mass % to 1.6 mass %, Zn: 0.01 mass % to 3.5 mass %, Mn: 0.01 mass % to 0.7 mass %, Fe: 0.01 mass % to 1.3 mass %, and Al and inevitable impurities: balance when the aluminum alloy material for die-casting as a whole is 100 mass %. In the aluminum alloy material for die-casting, a mass ratio of Fe to Mn (Fe/Mn) is 4.4 or less.
(2) An aluminum alloy material for die-casting comprises: Si: 9.6 mass % to 12 mass %, Cu: 1.5 mass % to 3.5 mass %, Mg: 0.01 mass % to 1.6 mass %, Zn: more than 3.0 mass % to 3.5 mass %, Mn: 0.01 mass % to 0.7 mass %, Fe: 0.01 mass % to 1.3 mass %, and Al and inevitable impurities: balance when the aluminum alloy material for die-casting as a whole is 100 mass %. In the aluminum alloy material for die-casting, a mass ratio of Fe to Mn (Fe/Mn) is 4.4 or less.
(3) In the aluminum alloy material for die-casting according to (1) or (2), a Mg content is 1.2 mass % to 1.6 mass %.
(4) In the aluminum alloy material for die-casting according to any one of (1) to (3), a Zn content is 3.3 mass % to 3.5 mass %.

(5) In the aluminum alloy material for die-casting according to any one of (1) to (4), a Mn content is 0.5 mass % to 0.7 mass %.
(6) In the aluminum alloy material for die-casting according to any one of (1) to (5), the mass ratio of Fe to Mn (Fe/Mn) is 2.6 or less.
(7) In the aluminum alloy material for die-casting according to claim (6), Fe and Mn form a block-like compound as a metallic structure.
(8) A method for manufacturing an aluminum alloy material for die-casting comprises: (i) preparing an aluminum scrap; (ii) analyzing a composition of the aluminum scrap prepared in the step (i); (iii) preparing a raw material of the aluminum alloy material for die-casting by adjusting the aluminum scrap whose composition has been analyzed in the step (ii) so as to have a composition of the aluminum alloy material for die-casting according to any one of (1) to (6); and (iv) homogenizing the raw material of the aluminum alloy material for die-casting prepared in the step (iii).
(9) A method for manufacturing an aluminum die-cast alloy comprises: (i) preparing the aluminum alloy material for die-casting according to any one of (1) to (7); and (ii) die-casting the aluminum alloy material for die-casting prepared in the step (i).

The present disclosure provides the aluminum alloy material for die-casting that allows being manufactured at low-price and has the high strength property and the sufficient elongation property as the aluminum alloy, and the method for manufacturing the same.

DETAILED DESCRIPTION OF THE EMBODIMENTS

Figure 1:
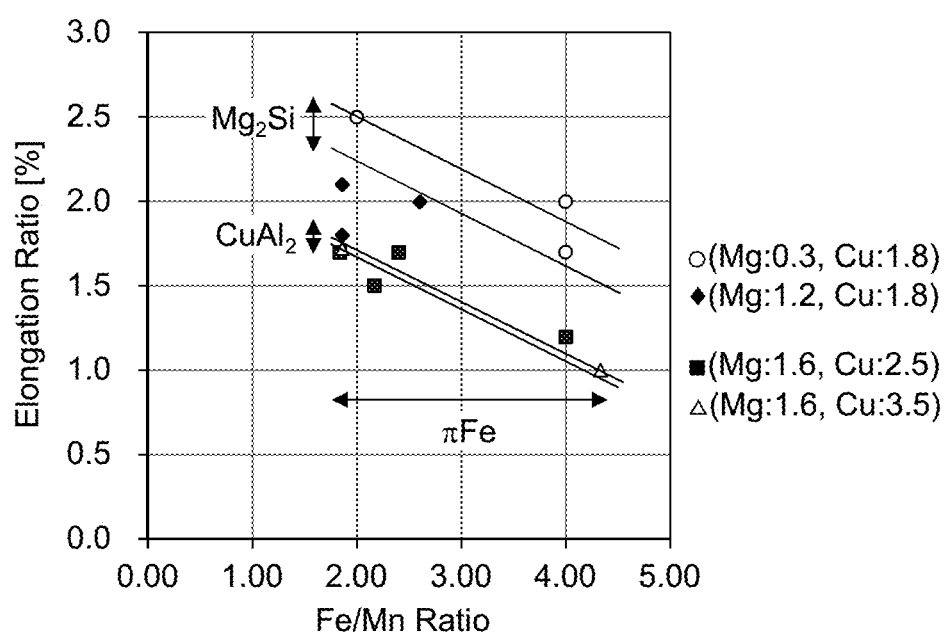
FIG. 1 is a graph illustrating a relation between Fe/Mn ratio (mass ratio) and elongation ratio of an aluminum alloy material for die-casting.

The following describes embodiments of the present disclosure in detail.

In the description, features of the present disclosure will be described with reference to the drawings as necessary. In the drawings, dimensions and shapes of respective components are exaggerated for clarification, and actual dimensions or shapes are not accurately illustrated. Accordingly, the technical scope of the present disclosure is not limited to the dimensions or the shapes of respective components illustrated in the drawings. Note that, an aluminum alloy material for die-casting and its manufacturing method of the present disclosure are not limited to the embodiments bellow, and can be performed in various configurations where changes, improvements, and the like which a person skilled in the art can make are given without departing from the gist of the present disclosure.

The present disclosure relates to an aluminum alloy material for die-casting containing, when the whole is 100 mass %, Si: 9.6 mass % to 12 mass %, Cu: 1.5 mass % to 3.5 mass %, Mg: more than 0.3 mass % to 1.6 mass %, Zn: 0.01 mass % to 3.5 mass %, Mn: 0.01 mass % to 0.7 mass %, Fe: 0.01 mass % to 1.3 mass %, and Al and inevitable impurities: balance, or containing Si: 9.6 mass % to 12 mass %, Cu: 1.5 mass % to 3.5 mass %, Mg: 0.01 mass % to 1.6 mass %, Zn: more than 3.0 mass % to 3.5 mass %, Mn: 0.01 mass % to 0.7 mass %, Fe: 0.01 mass % to 1.3 mass %, and Al and inevitable impurities: balance, and a mass ratio of Fe to Mn (Fe/Mn) is a constant value or less.

The aluminum alloy material for die-casting of the present disclosure is an aluminum alloy material containing silicon (Si), that is, an Al-Si based alloy.

In the present disclosure, a Si content in the aluminum alloy material for die-casting is 9.6 mass % to 12 mass %, and may be 10.3 mass % to 12.0 mass % in some embodiments, relative to a total mass of the aluminum alloy material.

Here, the Si content can be measured by a method of emission spectrochemical analysis.

In the present disclosure, with the Si content in the above-described range in the aluminum alloy material for die-casting, a metallic structure (intermetallic compound), for example, $Mg_2Si$ is formed with Mg, thus allowing providing an excellent mechanical property, enlarging a liquidus temperature range to increase a fluidity, and further, improving a rigidity and a wear resistance.

In the present disclosure, a copper (Cu) content in the aluminum alloy material for die-casting is 1.5 mass % to 3.5 mass %, and may be 1.8 mass % to 2.5 mass % in some embodiments, relative to the total mass of the aluminum alloy material.

Here, the Cu content can be measured by the method of emission spectrochemical analysis.

In the present disclosure, with the Cu content in the above-described range in the aluminum alloy material for die-casting, a metallic structure is formed with Al, thereby allowing improving a tensile strength of an aluminum alloy.

In the present disclosure, a Mg content in the aluminum alloy material for die-casting is more than 0.3 mass % to 1.6 mass %, more than 0.55 mass % to 1.6 mass % in some embodiments, and may be 1.2 mass % to 1.6 mass % in some embodiments, relative to the total mass of the aluminum alloy material. In the present disclosure, the Mg content in the aluminum alloy material for die-casting may be 0.01 mass % to 0.3 mass % when a Zn content is more than 3.0 mass % to 3.5 mass %, relative to the total mass of the aluminum alloy material.

Here, the Mg content can be measured by the method of emission spectrochemical analysis.

In the present disclosure, with the Mg content in the above-described range in the aluminum alloy material for die-casting, a metallic structure, for example, a Q-phase is formed with Al, Si, and/or Cu, thereby allowing improving the tensile strength and a material strength of the aluminum alloy.

In the present disclosure, a Zn content in the aluminum alloy material for die-casting is 0.01 mass % to 3.5 mass %, and may be 3.3 mass % to 3.5 mass % in some embodiments, relative to the total mass of the aluminum alloy material. In the present disclosure, the Zn content in the aluminum alloy material for die-casting is more than 3.0 mass % to 3.5 mass % when the Mg content is 0.01 mass % to 0.3 mass %, relative to the total mass of the aluminum alloy material.

Here, the Zn content can be measured by the method of emission spectrochemical analysis.

In the present disclosure, with the Zn content in the above-described range in the aluminum alloy material for die-casting, options of the raw material can be enhanced and the cost can be saved without negatively affecting the strength or a corrosion resistance of the aluminum alloy.

In the present disclosure, while a Mn content in the aluminum alloy material for die-casting depends on a Fe content as described in detail below, the Mn content is 0.01 mass % to 0.7 mass %, and may be 0.5 mass % to 0.7 mass % in some embodiments, relative to the total mass of the aluminum alloy material.

Here, the Mn content can be measured by the method of emission spectrochemical analysis.

In the present disclosure, with the Mn content in the above-described range in the aluminum alloy material for die-casting, a metallic structure, for example, a block-like metallic structure is formed with Al, Si, Mg, and/or Fe, thereby allowing suppressing the reduction in toughness of the aluminum alloy.

In the present disclosure, while the Fe content in the aluminum alloy material for die-casting depends on the Mn content as described in detail below, the Fe content is 0.01 mass % to 1.3 mass %, and may be 0.6 mass % to 1.0 mass % in some embodiments, relative to the total mass of the aluminum alloy material.

Here, the Fe content can be measured by the method of emission spectrochemical analysis.

In the present disclosure, with the Fe content in the above-described range in the aluminum alloy material for die-casting, a metallic structure, for example, Al-Si-Mg-Fe-Mn is formed with Mn, thereby improving a high-temperature strength of the aluminum alloy, and suppressing seizure of the aluminum die-cast alloy and a mold during a die-casting.

In the present disclosure, the mass ratio of Fe to Mn (Fe/Mn) in the aluminum alloy material for die-casting is 4.4 or less, 2.6 or less in some embodiments, and may be from 0.85 to 2.6 in some embodiments.

In the present disclosure, with the mass ratio of Fe to Mn in the above-described range in the aluminum alloy material for die-casting, a compound formed of Mn and Fe as a metallic structure in the aluminum alloy has a form of a block-like compound, especially, a form of a block-like compound containing Mn in the compound in an observation by a scanning electron microscope (SEM) and an energy dispersive X-ray spectroscopy (EDS), thereby allowing sufficiently ensuring an elongation property (for example, elongation ratio) while enhancing strength properties (for example, hardness, tensile strength, yield stress).

The aluminum alloy material for die-casting in the present disclosure can contain an element(s), such as nickel (Ni) of usually 0.5 mass % or less, tin (Sn) of usually 0.3 mass % or less, chromium (Cr) of usually 1 mass % or less, titanium (Ti) of usually 0.3 mass % or less, and/or calcium (Ca) of usually 0.1 mass % or less, relative to the total mass of the aluminum alloy material, in addition to the above-described elements.

Furthermore, with the aluminum alloy material for die-casting in the present disclosure containing Sr and/or Na element in addition to the above-described elements, Si in the aluminum alloy can be fined, thereby allowing improving the strength and the wear resistance of the aluminum alloy.

Table 1 indicates the compositions of the aluminum alloy material for die-casting in the present disclosure compared with the composition of a conventional aluminum alloy material for die-casting.

TABLE 1

| | Si | Cu | Mg | Zn | Mn | Fe | (Ni) | (Sn) |
|---|---|---|---|---|---|---|---|---|
| Conventional (ADC12) | 9.6-12.0 | 1.5-3.5 | ≤0.3 | ≤3.0 | ≤0.5 | ≤1.3 | ≤0.5 | ≤0.3 |
| Present Disclosure | 9.6-12.0 | 1.5-3.5 | More Than 0.3-1.6 | ≤3.5 | ≤0.7*[1] | ≤1.3*[1] | ≤0.5 | ≤0.3 |
| | 9.6-12.0 | 1.5-3.5 | 0.01-1.6 | More Than 3.0-3.5 | ≤0.7*[1] | ≤1.3*[1] | ≤0.5 | ≤0.3 |

*[1]Fe/Mn ≤ 4.4

Since the aluminum alloy material for die-casting in the present disclosure has the above-described composition, in the aluminum alloy material for die-casting or the aluminum alloy in the present disclosure, even when the contents of Mg and/or Zn are large, the tensile strength after natural aging (25° C., 1800 hours or more) is usually 289 MPa or more and may be 295 MPa to 322 MPa in some embodiments, the yield stress is usually 140 MPa or more and may be 158 MPa to 222 MPa in some embodiments, the elongation ratio is usually 1.0% or more, 1.5% or more in some embodiments, and may be 1.5% to 2.5% in some embodiments, and the elongation ratio after natural aging (25° C., 1800 hours) is usually 1.0% or more. The strength properties and the elongation property can be each measured by Metallic materials-Tensile testing-Method of test at room temperature of Japanese Industrial Standard Z2241.

The aluminum alloy material for die-casting or the aluminum alloy in the present disclosure has the excellent properties of fatigue strength, corrosion resistance, crack propagation resistance, and permanent growth inhibition, in addition to the above-described properties.

The aluminum alloy material for die-casting in the present disclosure means a raw material of the aluminum die-cast alloy. The aluminum alloy material for die-casting in the present disclosure may be a state of powder or the like, a state of molten metal, and a state of casting, for example, an aluminum alloy ingot. In the present disclosure, the aluminum alloy includes the aluminum alloy material for die-casting (usually, casting state) and the aluminum die-cast alloy manufactured from the aluminum alloy material for die-casting. Since the composition does not change during manufacturing of the aluminum die-cast alloy from the aluminum alloy material for die-casting, the aluminum alloy material for die-casting and the aluminum die-cast alloy have the same composition.

In the present description, the casting means a molded product manufactured by pouring a molten metal (including alloy) melted at a high temperature into a hollow portion (cavity) of a mold made of sand, metal, or the like, and cooling to harden the molten metal. Therefore, the casting includes molded products manufactured by low pressure casting, gravitation casting, die-casting, and the like. Meanwhile, the die-cast alloy means a molded product manufactured by pressure-injecting a molten alloy melted at a high temperature into a hollow portion of a mold made of metal or the like with a pressure of, for example, usually 50 MPa to 120 MPa, 50 MPa to 100 MPa in some embodiments, cooling the molten alloy at a high speed at a cooling speed of, for example, usually 5° C/second to 3000° C/second, 100° C/second to 1000° C/second in some embodiments to harden the molten alloy, that is, a molded product manufactured by die-casting.

The aluminum alloy material for die-casting in the present disclosure is molded by die-casting, thus allowing to be used as a lightweight material substituted for an iron-based material, for example, in the field of automobile and motorcycle, usable for a body structure member, a chassis member, a wheel, a space frame, a steering wheel (cored bar), a seat frame, a suspension member, an engine block, a mission case, a pulley, an oil pan, a shift lever, an instrument panel, a door impact panel, an intake surge tank, a pedal bracket, a front shroud panel, and the like.

The aluminum alloy material for die-casting in the present disclosure can be manufactured by a technique known in the technical field except for adjusting the composition of the raw material of the aluminum alloy material for die-casting to the composition of the aluminum alloy material for die-casting in the present disclosure.

In the aluminum alloy material for die-casting in the present disclosure, since the contents of Mg and/or Zn are large, an aluminum scrap is usable as a raw material of the aluminum alloy material for die-casting. Therefore, the aluminum alloy material for die-casting in the present disclosure can be manufactured by, for example, a method comprising: (i) a step of preparing an aluminum scrap; (ii) a step of analyzing a composition of the aluminum scrap prepared in the step (i); (iii) a step of preparing a raw material of the aluminum alloy material for die-casting by adjusting the aluminum scrap whose composition has been analyzed in the step (ii) so as to have the said composition of the aluminum alloy material for die-casting; and (iv) a step of homogenizing the raw material of the aluminum alloy material for die-casting prepared in the step (iii).

The steps (i) to (iv) will be described below.

(i) Step of Preparing Aluminum Scrap

In the step (i), an aluminum scrap is prepared.

In the step (i), examples of the aluminum scrap include ADC12 reflux scrap (Al-Si alloy) (which includes, for example, planned products, defective products, chips, products collected in market, and the like of aluminum die-cast components), 5000 series scrap (Al-Mg alloy), 6000 series scrap (Al-Mg-Si alloy), and 7000 series scrap (Al-Zn-Mg alloy) (which include, for example, panel materials for automobile and home appliance, a wrought aluminum material such as a radiator, and an aircraft component material). Not only one aluminum scrap, but also two or more aluminum scraps may be prepared.

By preparing the aluminum scrap in the step (i), the cost of the aluminum alloy material for die-casting can be saved.

(ii) Step of Analyzing Composition of Aluminum Scrap

In the step (ii), the composition of the aluminum scrap prepared in the step (i) is analyzed.

While an analytical method of the composition of the aluminum scrap, especially, the contents of Si, Cu, Mg, Zn, Mn, and Fe, is not limited, the composition of the aluminum scrap can be analyzed by, for example, the method of emission spectrochemical analysis and fluorescent X-ray analysis (XRF).

By analyzing the composition of the aluminum scrap in the step (ii), the raw material of the aluminum alloy material for die-casting having the composition the same as that of the aluminum alloy material for die-casting to be manufactured can be prepared in the step (iii).

(iii) Step of Preparing Raw Material of Aluminum Alloy Material for Die-Casting

In the step (iii), the raw material of the aluminum alloy material for die-casting is prepared by adjusting the aluminum scrap whose composition has been analyzed in the step (ii) so as to have the said composition of the aluminum alloy material for die-casting.

In the step (iii), the raw material of the aluminum alloy material for die-casting can be prepared by, for example, adding an additive to the aluminum scrap. As the additive, an additive known in the technical field for adjusting the contents of the elements in the aluminum alloy material for die-casting is usable, and examples of the additive include one or more metals or alloys selected from the group consisting of Si, Cu, Mg, Zn, Mn, and Fe.

The raw material of the aluminum alloy material for die-casting can be prepared by, for example, adjusting a mixing ratio of two or more aluminum scraps based on the analysis result of the composition of the aluminum scrap in the step (ii).

(iv) Step of Homogenizing Raw Material of Aluminum Alloy Material for Die-Casting In the step (iv), the raw material of the aluminum alloy material for die-casting prepared in the step (iii) is homogenized.

In the step (iv), examples of the method for homogenizing the raw material of the aluminum alloy material for die-casting include a method in which the raw materials of the aluminum alloy material for die-casting are simply mixed. This method can be employed when the raw materials of the aluminum alloy material for die-casting are each in an easily mixed form, such as a powder form and a granular form.

Alternatively, in the step (iv), examples of the method for homogenizing the raw material of the aluminum alloy material for die-casting include a method in which an aluminum alloy molten metal is prepared by melting the raw material of the aluminum alloy material for die-casting.

Subsequently, the prepared aluminum alloy molten metal can be casted by appropriately selecting an ordinary melt-casting method, such as a continuous casting method, a continuous casting and rolling method, a semi-continuous casting method (DC casting method), and a hot-top casting method, or a die-casting method.

[Examples]

While the following describes some Examples regarding the present disclosure, it is not intended to limit the present disclosure to those described in such Examples.

1. Sample Preparation and Measurement of Elongation Ratio

The aluminum alloy materials for die-casting of Comparative Examples 1 to 3 and Examples 1 to 9 were manufactured by melting the raw materials of the aluminum alloy material for die-casting containing chemical compositions described in Table 2, and an elongation ratio (E) of each aluminum alloy materials-Tensile testing-Method of test at room temperature of JIS Z2241.

TABLE 2

| Sample | Si | Cu | Mg | Zn | Mn | Fe | Fe/Min | E (%) |
|---|---|---|---|---|---|---|---|---|
| Comparative Example 1 | 9.6 | 1.8 | 0.3 | 1.0 | 0.4 | 0.8 | 2.00 | 2.5 |
| Comparative Example 2 | 11.5 | 2.0 | 0.3 | 0.9 | 0.2 | 0.8 | 4.00 | 1.7 |
| Comparative Example 3 | 10.5 | 1.8 | 0.3 | 0.9 | 0.2 | 0.8 | 4.00 | 2.0 |
| Example 1 | 10.5 | 1.8 | 1.3 | 3.3 | 0.7 | 1.3 | 1.86 | 2.1 |
| Example 2 | 11.0 | 1.9 | 1.2 | 3.3 | 0.7 | 1.3 | 1.86 | 1.8 |
| Example 3 | 10.4 | 1.8 | 1.3 | 3.3 | 0.5 | 1.3 | 2.60 | 2.0 |
| Example 4 | 10.5 | 2.5 | 1.6 | 3.5 | 0.6 | 1.1 | 1.83 | 1.7 |
| Example 5 | 10.8 | 2.5 | 1.6 | 3.4 | 0.6 | 1.3 | 2.17 | 1.5 |
| Example 6 | 10.5 | 2.6 | 1.5 | 3.4 | 0.5 | 1.2 | 2.40 | 1.7 |
| Example 7 | 10.5 | 3.5 | 1.4 | 3.4 | 0.7 | 1.3 | 1.86 | 1.7 |
| Example 8 | 11.5 | 2.6 | 1.5 | 3.5 | 0.3 | 1.2 | 4.00 | 1.2 |
| Example 9 | 11.5 | 3.5 | 1.6 | 3.5 | 0.3 | 1.3 | 4.33 | 1.0 |

FIG. 1 illustrates a relation between the Fe/Mn ratio (mass ratio) and the elongation ratio of the aluminum alloy material for die-casting based on Table 2.

It was seen from FIG. 1 that the elongation ratio increased as the Fe/Mn ratio (mass ratio) decreased.

2. Measurement of Structure of Aluminum Alloy Material for Die-Casting

Figure 2:
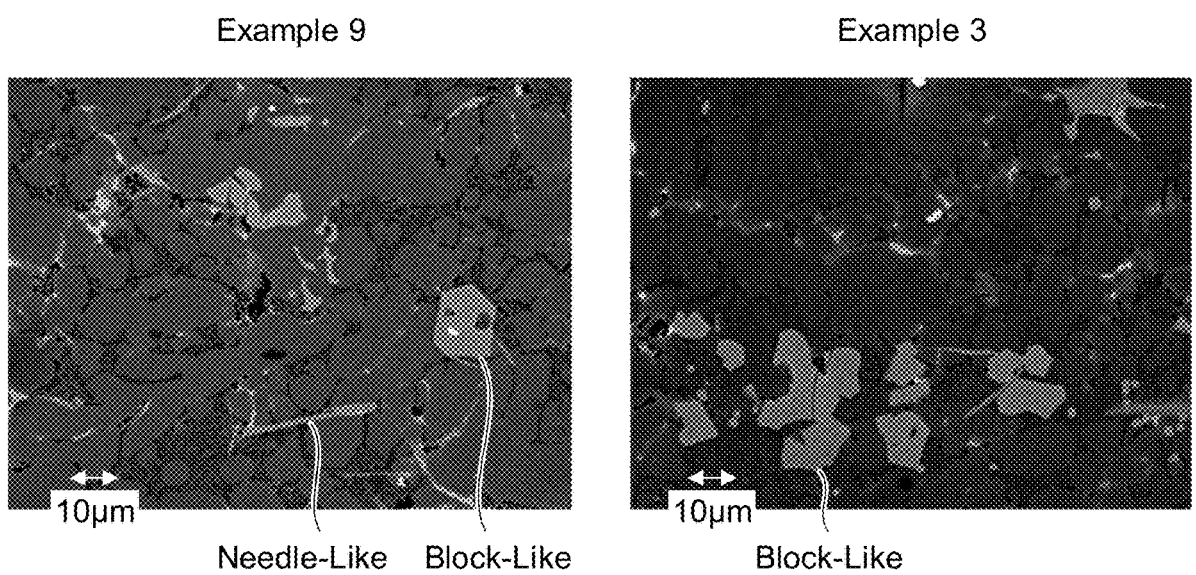
FIG. 2 includes SEM photographs illustrating structures in aluminum alloy materials for die-casting of Example 9 and Example 3.

For Example 9 and Example 3, the structures of the aluminum alloy materials for die-casting were measured by SEM. FIG. 2 illustrates the structures of the aluminum alloy materials for die-casting of Example 9 and Example 3.

It was seen from FIG. 2 that while the presence of a needle-like metallic structure formed of Fe, Si, and Al was observed in Example 9, the most part was block-like metallic structures formed of Al, Si, Mg, Fe, and Mn in Example 3.

It was found that the block-like compound formed of Al, Si, Mg, Fe, and Mn as the metallic structure in the aluminum alloy material for die-casting allowed ensuring the sufficient elongation ratio, especially, the elongation ratio of 1.5% or more.

3. Measurement of Mechanical Property of Aluminum Alloy Material for Die-Casting For the aluminum alloy materials for die-casting of Comparative Example 3 and Example 4, the change of hardness by natural aging (about 25° C.) was measured. Table 3 and FIG. 3 illustrate relations between aging time T (Log T) and the hardnesses of the aluminum alloy materials for die-casting of Comparative Example 3 and Example 4.

[Table 3]

| Aging Time T [h] | Tim Log T [h] | Comparative Example 3 [HV] | Example 4 [HV] |
|---|---|---|---|
| 1 | 0.00 | 90 | 101 |
| 3 | 0.48 | 95 | 103 |
| 5 | 0.70 | 92 | 109 |
| 21 | 1.32 | 94 | 110 |
| 25 | 1.40 | 102 | 109 |
| 169 | 2.23 | 100 | 115 |
| 337 | 2.53 | 99 | 113 |
| 505 | 2.70 | 99 | 115 |
| 673 | 2.83 | 103 | 116 |
| 841 | 2.92 | 110 | 118 |
| 1009 | 3.00 | 103 | 119 |
| 1393 | 3.14 | 106 | 119 |
| 1513 | 3.18 | 103 | 120 |
| 1681 | 3.23 | 105 | 117 |
| 1849 | 3.27 | 106 | 118 |
| 2017 | 3.30 | 110 | 127 |

Figure 3:
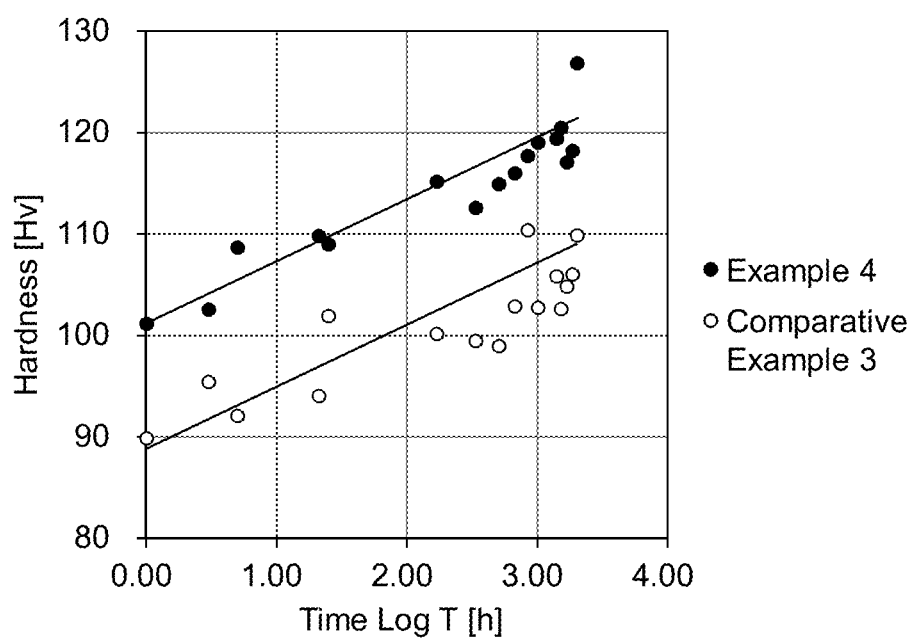
FIG. 3 is a graph illustrating relations between aging time T (Log T) and hardnesses of aluminum alloy materials for die-casting of Comparative Example 3 and Example 4.

It was seen from Table 3 and FIG. 3 that the aluminum alloy material for die-casting of Example 4 had the hardness higher than that of the aluminum alloy material for die-casting of Comparative Example 3. The superiority or inferiority of the hardness was not changed by the natural aging, and the aluminum alloy material for die-casting of Example 4 had the hardness higher than that of the aluminum alloy material for die-casting of Comparative Example 3 even at a time point after the elapse of 1800 hours.

Subsequently, at a time point after the natural aging for 1800 hours or more, the tensile strength, the yield stress, and the elongation ratio of the aluminum alloy material for die-casting were measured based on Metallic materials-Tensile testing-Method of test at room temperature of JIS Z2241 for each of Example 4 and Comparative Example 3. Table 4 illustrates the result.

TABLE 4

Mechanical Property Value (Natural Aging 1800 Hours or More)

| | Comparative Example 3 | Example 4 |
|---|---|---|
| Tensile Strength [MPa] | 290 | 313 |
| Yield Stress [MPa] | 135 | 231 |
| Elongation Ratio [%] | 3.4 | 1.2 |

It was seen from Table 4 that the aluminum alloy material for die-casting of Example 4 had the tensile strength and the yield stress higher than those of the aluminum alloy material for die-casting of Comparative Example 3. While the aluminum alloy material for die-casting of Example 4 had the elongation ratio lower than that of the aluminum alloy material for die-casting of Comparative Example 3, the elongation ratio of the aluminum alloy material for die-casting of Example 4 was 1.0% or more.

As described above, it was found that the combination of the natural aging and the artificial aging provided the aluminum alloy material for die-casting of the present disclosure with the mechanical properties, for example, the tensile strength and the yield stress, higher than those of the conventional aluminum alloy material for die-casting while providing the elongation ratio of 1.0% or more.

All publications, patents and patent applications cited in the present description are herein incorporated by reference as they are.

What is claimed is:

1. An aluminum alloy material for die-casting, comprising:
   Si: 9.6 mass % to 12 mass %,
   Cu: 1.8 mass % to 2.5 mass %,
   Mg: 1.2 mass % to 1.6 mass %,
   Zn: 3.3 mass % to 3.5 mass %,
   Mn: 0.5 mass % to 0.7 mass %,
   Fe: 0.6 mass % to 1.3 mass %, and
   Al and inevitable impurities: balance,
   when the aluminum alloy material for die-casting as a whole is 100 mass %, wherein a mass ratio of Fe to Mn (Fe/Mn) is 4.4 or less.

2. The aluminum alloy material for die-casting according to claim 1, wherein the mass ratio of Fe to Mn (Fe/Mn) is 2.6 or less.

3. The aluminum alloy material for die-casting according to claim 2, wherein Fe and Mn form a block-like compound as a metallic structure.

* * * * *